(12) United States Patent
Shorter et al.

(10) Patent No.: US 6,182,064 B1
(45) Date of Patent: Jan. 30, 2001

(54) METHOD AND SYSTEM FOR IDENTIFYING AN OBJECT LOCATED AMONG A NUMBER OF MULTIPLE INTERCONNECTED COMPUTING SYSTEMS

(75) Inventors: David Uel Shorter, Lewisville, TX (US); Susan Carol Lilly, Potomac, MD (US); Robert Bruce Scott, Hollis, NH (US)

(73) Assignee: International Business Machines Corporation, Armonk, NY (US)

( * ) Notice: Under 35 U.S.C. 154(b), the term of this patent shall be extended for 0 days.

(21) Appl. No.: 09/036,244

(22) Filed: Mar. 6, 1998

(51) Int. Cl.$^7$ .................................................. G06F 17/30
(52) U.S. Cl. ............................ 707/3; 707/104; 707/103
(58) Field of Search ................................ 707/3, 103, 104, 707/100, 10; 709/201, 218, 245

(56) References Cited

U.S. PATENT DOCUMENTS

| | | | |
|---|---|---|---|
| 4,893,232 | 1/1990 | Shimaoka et al. | 364/200 |
| 5,226,161 | 7/1993 | Khoyi et al. | 395/650 |
| 5,303,379 | 4/1994 | Khoyi et al. | 395/700 |
| 5,369,778 | 11/1994 | San Soucie et al. | 395/800 |
| 5,421,012 | 5/1995 | Khoyi et al. | 395/650 |
| 5,421,015 | 5/1995 | Khoyi et al. | 395/650 |
| 5,499,371 | 3/1996 | Henninger et al. | 395/700 |
| 5,548,749 | 8/1996 | Kroenke et al. | 395/600 |
| 5,557,747 | 9/1996 | Rogers et al. | 395/200.11 |
| 5,615,362 | 3/1997 | Jensen et al. | 395/614 |
| 5,634,124 | 5/1997 | Khoyi et al. | 395/614 |
| 5,815,710 | * 9/1998 | Martin et al. | |
| 5,946,680 | * 8/1999 | Shorter et al. | 707/3 |
| 5,946,681 | * 8/1999 | Shorter | 707/3 |
| 6,070,169 | * 5/2000 | Shorter | 707/103 |

FOREIGN PATENT DOCUMENTS

0721160A2  3/1997 (EP) .................. G06F/9/44

OTHER PUBLICATIONS

IBM Technical Disclosure Bulletin, vol. 36, No. 10, Oct. 1993, Technique to Convert a LAN Netview Start SQL Database Into ASCII Database Files.
IBM Technical Disclosure Bulletin, vol. 37, No. 03, Mar. 1994, Multimedia Mixed Object Envelopes Supporting a Graduated Fee Scheme via Encryption.
IBM Technical Disclosure Bulletin, vol. 39, No. 05, May 1996, Backup Objects.

(List continued on next page.)

*Primary Examiner*—Paul V. Kulik
(74) *Attorney, Agent, or Firm*—Richard A. Tomlin; Felsman, Bradley, Vaden, Gunter & Dillon,LLP

(57) ABSTRACT

Provided are a method and system for locating data stored within an environment having multiple interconnected computing systems. The method and system achieve their objects via the following actions. A superset of one or more elements comprised of data location identifiers and associated data attributes is created. A list of data attributes is received. In response to said received list of data attributes, any data location identifiers, within said created superset, which have the data attributes in the list, are transmitted. In one embodiment, the superset elements consist of object identifiers paired with the computing system wherein the objects associated with the object identifiers are located, the list of data attributes contains a list of object attributes, and the data location identifiers transmitted consist of an object identifier paired with a computing location.

20 Claims, 7 Drawing Sheets

OTHER PUBLICATIONS

IBM Technical Disclosure Bulletin, vol. 40, No. 02, Feb. 1997, OPtimizing Use of Local Coordinators in Distributed Applications.

Abstract–Specifying object–oriented federated databases from existing databases. Lim EP; Lim ML; Srivastava J.

Abstract—Construction versus composition: a question of reliability. Hiaduk HP.

Abstract—The BeBOP system. Lee J; Davison A.

Abstract—Optimization of distributed tree queries. Yu CT; Ozsoyoglu ZM; Lam K.

Abstract—Effects of updates on optimality in tries. Comer D.

Abstract—Subroutine invocation method for abject oriented system . . . Chow C.

Abstract—Automatic object–oriented data information mapping method for database . . . Henninger DP; Jensen RH; Keene CT; Jansen RH.

Abstract—Coupling application programme to structured database . . . Henninger DP; Jensen RH.

\* cited by examiner

METHOD AND SYSTEM FOR IDENTIFYING AN OBJECT LOCATED AMONG A NUMBER OF MULTIPLE INTERCONNECTED COMPUTING SYSTEMS

CROSS-REFERENCE TO RELATED PATENT APPLICATION

The present invention is related to the subject matter of the U.S. Pat. Application entitled "Method of Determining the Unique ID of an Object Through Analysis of Attributes Related to the Object," filed Nov. 28, 1997, application Ser. No. 08/890,335, assigned to the assignee herein named. The contents of the abovementioned patent application is incorporated by reference herein.

BACKGROUND OF THE INVENTION

1. Technical Field

The present invention relates, in general, to computing systems. In particular, the present invention relates to computing systems having objects distributed across multiple interconnected computing systems.

2. Description of the Related Art

A computing system is a system which, among other things, stores and retrieves information. One type of information stored and retrieved by a computing system is typically referred to as an "object." An "object," when utilized in the context of a computing system, refers to a variable comprising both routines and data that is treated as a discrete entity.

When an object is stored in a computing system, it is given an identification (ID) which is unique within a scope. The object ID is utilized internal to a computing system as a "key" to manifest the object when desired. The object ID may or may not be known outside of the computing system.

It is sometimes desirable to construct a set of attributes about an object such that when all, or a subset of the attributes, are supplied by a requester, the ID of the object can be determined and returned to the requestor. These attributes are created and stored, generally at the time that the original object is added to the computing system, in a data structure which will be referred to herein as an Object Attributes Record (OAR). The object ID associated with a particular object is also stored in the OAR associated with that particular object. The set of OARs in an individual computing system is often referred to as an "object index."

Utilizing an "object index," it is possible to determine an object's ID via the utilization of a computational entity (or computer logic), which will be referred to herein as an Object Resolution Service (ORS). An ORS can be conceived of as an entity which receives a list of attributes, and returns an object ID associated with an object having some or all of the attributes in the received list, if such an object is known within the computing system wherein the ORS is resident.

Methods (such as ORSs) exist for utilizing attributes of an object to determine an object ID within the scope of a single computing system. However, when multiple interconnected computing systems are involved, and conditions are such that an object may reside on any one of the multiple interconnected computing systems, obtaining an object ID for a particular object on the basis of a list of attributes is a complex and difficult problem.

Presently, no serious attempts have been made to solve the foregoing noted problem. Most of the efforts to date have focused on the problem of identifying object IDs within the confines of one computing system. It is thus apparent that a need exists for a method and system which provide the determination of an object's ID on the basis of that object's attributes when such an object can reside on at least one computing system among multiple interconnected computing systems.

SUMMARY OF THE INVENTION

It is therefore one object of the present invention to provide a method and system for use with computing systems.

It is yet another object of the present invention to provide a method and system for use with computing systems which provide the determination of an object's ID on the basis of that object's attributes when such object can reside on at least one computing system among multiple interconnected computing systems.

The method and system achieve their objects via the following actions. A superset of one or more elements comprised of data location identifiers and associated data attributes is created. A list of data attributes is received. In response to said received list of data attributes, any data location identifiers, within said created superset, which have the data attributes in the list, are transmitted. In one embodiment, the superset elements consist of object identifiers paired with the computing system wherein the objects associated with the object identifiers are located, the list of data attributes contains a list of object attributes, and the data location identifiers transmitted consist of an object identifier paired with a computing location.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Indexes may exist in a single computing system which are utilized to resolve attributes of an object to obtain a unique ID of the object. But for the present invention, when a number of interconnected computing systems exist, each with its own set of object indexes, it becomes a complex problem to resolve the ID of an object which could exist on any one of the computing systems when the request for the object ID is from a different computing system. The present invention provides a method for creating supersets of object IDs and linking them together in a network of supersets. The supersets are then utilized to determine an object ID related to an object existing within a number of computing systems.

One embodiment of the present invention provides a method and system for identifying an object's ID on the basis of that object's attributes when such an object can reside on at least one computing system among multiple interconnected computing systems. The embodiment provides identification of such an object ID by providing intelligent entities, referred to herein as Object Resolution Services (ORSs) capable of creating supersets of Object Attribute Records (OARs), associated with their respective object IDs, and further capable of thereafter linking such created supersets together in a network of supersets.

Figure 1:
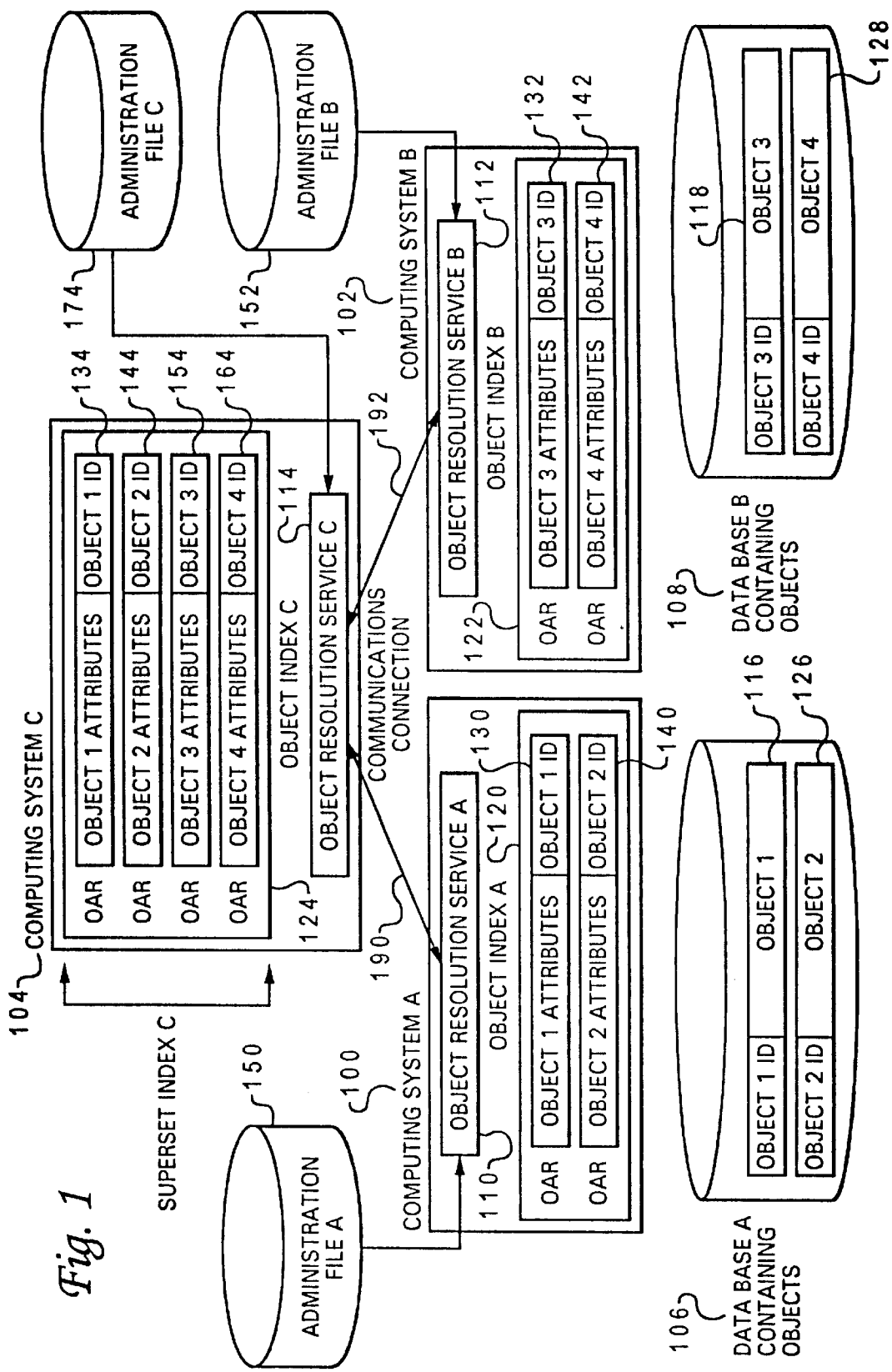
FIG. 1 shows an embodiment of the present invention implemented within an example environment with two computing systems and one superset index.

Refer now to FIG. 1. FIG. 1 shows an embodiment of the present invention implemented within an example environment with peer computing systems and a third computing system where one superset index will reside.

The example environment illustrated in FIG. 1 consists of three computing systems, Computing System A 100, Computing System B 102, and Computing System C 104. Depicted is that each computing system contains the following ORS entities: Object Resolution Service A 110, Object Resolution Service B 112, and Object Resolution Service C 114 (such entities being capable of being implemented in software, hardware, or some combination thereof). Illustrated is that each computing system contains the following object indexes: Object Index A 120, Object Index B 122, and Object Index C 124 (such indexes being capable of being implemented in software, hardware, or some combination thereof). Shown is that Object Index A 120 contains OARs consisting of an Object 1 OAR 130 and an Object 2 OAR 140. Object Index B 122 contains OARs consisting of an Object 3 OAR 132 and an Object 4 OAR 142. Object Index C 124 contains OARs consisting of an Object 1 OAR 134, Object 2 OAR 144, Object 3 OAR 154, and Object 4 OAR 164. In other words, Object Index C 124 contains a superset of OAR's in Object Index A 120 and Object Index B 122.

In addition to multiple attributes about an object, shown in FIG. 1 is that each OAR contains the object ID of its associated object. The objects (that is, the actual information associated with individual object IDs) themselves are stored in databases. This relationship is depicted via Database A 106 containing object composed of object 1 associated with object 1 ID 116 and object composed of object 2 associated with object 2 ID 126. Also shown is Database B 108 containing object composed of object 3 associated with object 3 ID 118 and object composed of object 4 associated with object 4 ID 128. It is thus apparent from the databases shown that the object IDs can be used to "key" to the objects themselves. For sake of illustration, the object IDs shown have been chosen such that they are unique across Computing System A 100 and Computing System B 102. The three ORSs, ORS A 110 , ORS B 112, and ORS C 114, can communicate through a communications connections 190 and 192.

In this environment, ORS A 110 and ORS B 112 are independent and have no connection between them, or the need, within the context of determining an object's ID, for any knowledge of the other's existence due to the presence of an embodiment of the present invention.

Each computing system A 100, B 102, and C 102, contains Administration File A 150, Administration File B 152, and Administration File C 174, respectively. A systems administrator (not shown) provides system operation information which is kept in the administration files. For the example operation depicted in FIG. 1, the pertinent information specified in Administration Files A 150 and B 152 define the computing system location of ORS C 114 (i.e., Data-Processing System C 104). The pertinent information specified in the Administration File C 174 defines the computing system locations of ORSs A 110 and B 112 (i.e., Data-Processing Systems A 100, and B 102, respectively).

Although the system depicted in FIG. 1 has shown the superset ORS and superset index located on a seperate computing system, those skilled in the art will recognize that a superset ORS and superset index can be co-resident on the same computing system, somewhat analogous to the way the same computing system can function as both a client and a server.

Figure 2:
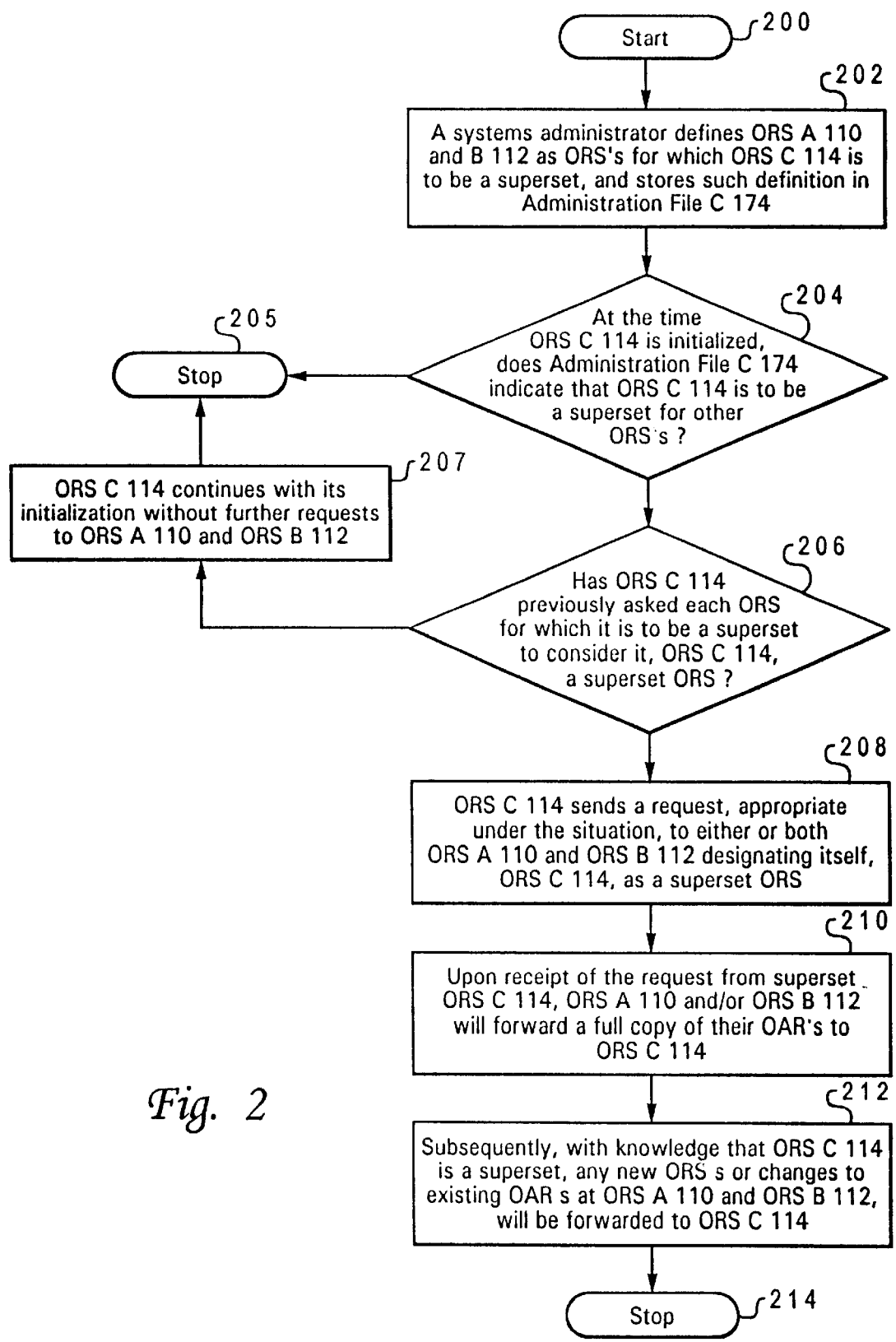
FIG. 2 depicts a method of one embodiment of the present invention that will be demonstrated in the context of the example environment set forth in FIG. 1.

Refer now to FIG. 2. FIG. 2 depicts a method of one embodiment of the present invention that will be demonstrated in the context of the example environment set forth in FIG. 1. With respect to the method depicted in FIG. 2, it is to be assumed that Computing System A 100 and Computing System B 102 previously existed in a peer-to-peer relationship, such that each computing system was managing its own set of OARs. It is also to be assumed that a desire has arisen to change Computing System A 100 and Computing System B 102 from a peer-to-peer relationship to a system containing a superset in accordance with one embodiment of the present invention. It should be noted that in a peer-to-peer environment having only two ORSs, the number of communication connections required to resolve an object ID is limited to one (e.g., the communication connection between the peer ORSs). This can be seen by reference to FIG. 1, wherein it can be seen that a request to determine an object's ID would, hypothetically, need only be handled by communication (not shown) between ORS A 110 and ORS B 112. When a peer-to-peer environment consists of computing systems whose number exceeds two, the number of communications connections required is equal to the number of ORSs in the configuration. Therefore, when the number of computing systems in a configuration exceeds two, it becomes more efficient to configure the environment with superset(s) in accord with an embodiment of the present invention.

Under the assumption that ORS A 110 and ORS B 112 are initially in a peer-to-peer relationship whereby both ORSs are employed to determine an object's ID, it is desirable that the creation of a superset not disrupt their operation; that is, the superset is created transparently to ORS A 110 and B 112. Creation of a superset of OARs is accomplished through the following method illustrated in FIG. 2.

Refer now to FIG. 2. Method step 200 shows the start of the process. Method step 202 depicts that a systems administrator defines ORS A 110 and B 112 as ORSs for which ORS C 114 is to be a superset, and stores such definition in Administration File C 174. Method step 204 illustrates that when ORS C 114 is initialized, it will interrogate Administration File C 174 to determine if it is to be a superset for other ORSs. (In the example environment shown in FIG. 1, it will determine that it is to be a superset for ORS A 110 and ORS B 112.) In the event that ORS C 114 is not to be a superset, the process proceeds to method step 205 and stops.

In the event that ORS C 114 is to be a superset, method step 206 depicts that ORS C 114 will then determine if it has previously asked each ORS to consider it, ORS C 114, a superset ORS.

If ORS C 114 has previously asked both ORS A 110 and ORS B 112 to consider it a superset ORS, method step 207 shows that ORS C 114 will continue with its initialization without further requests to ORS A 110 and ORS B 112. Thereafter, the process proceeds to method step 205 and stops. In the event that either ORS A 110 or ORS B 112 has not been asked to consider ORS C 114 a superset, method step 208 illustrates that ORS C 114 will send a request, appropriate to the situation, to either or both ORS A 110 and ORS B 112 designating itself, ORS C 114, as a superset ORS.

Method step 210 shows that upon receipt of the foregoing noted request from superset ORS C 114, ORS A 110 and/or ORS B 112 each will forward a full copy of their OARs to ORS C 114. Method step 212 depicts that, subsequently, with knowledge that ORS C 114 is a superset, any new ORSs or changes to existing OARs at ORS A 110 and ORS B 112, will be forwarded to ORS C 114. Method step 214 illustrates the end of the process.

It can be seen that through the enactment of the above-described method set forth in FIG. 2, ORS C 114 will contain a copy of all of the OARs which exist on both ORS A 110 and ORS B 112. Further, the OAR information at ORS C 114 will be of the same currency as OAR information in ORS A 110 and ORS B 112.

With respect to the process illustrated in FIG. 2, it should be noted that in one embodiment the initial copying of OARs from ORS A 110 and ORS B 112 to ORS C 114 is done asynchronously as a subsequent OAR add/update(s). ORS A 110 and ORS B 112 place OAR copies and add/update(s) on queues located on Computing Systems A 100 and B 102, respectively, whose targets are queues in Computing System C 104 to which ORS C 114 is connected. If Computing System C 104 is not operational, or if communication link failure occurs, the copies and add/update(s) are not lost. When correction to the malfunctioning environment occurs, the copies and add/updates flow to ORS C 114.

When trying to determine an object's ID, it is part of one embodiment of the present invention that superset ORSs exist transparently within a network configuration. That is, when a ORS determines that it must forward an object ID resolution request to another ORS, the requesting ORS need not know that it is communicating with a superset ORS; that is, the logic is the same as if it were communicating with a peer ORS. Further, it is part of one embodiment of the present invention that, within the context of object ID resolution, a superset ORS need not know that it is a superset ORS. The determination of whether another ORS is a peer or is a superset is made by the systems administrator and placed in an ORS's Administration File.

Given the above, the method to determine an object's ID when one or more ORS supersets exist within a plurality of computing systems can be such as that defined in our previous patent entitled "Method of Determining the Unique ID of an Object Through Analysis of Attributes Related to the Object," filed Nov. 28, 1997, application Ser. No. 08/890,335, which is hereby incorporated by reference in its entirety.

FIG. 1 demonstrated an example environment wherein a single superset was created. For a variety of reasons, within a plurality of computing systems, it may be required to create multiple superset ORSs, with each a superset of some subset of other ORSs. An example of this configuration is shown in FIG. 3.

Figure 3:
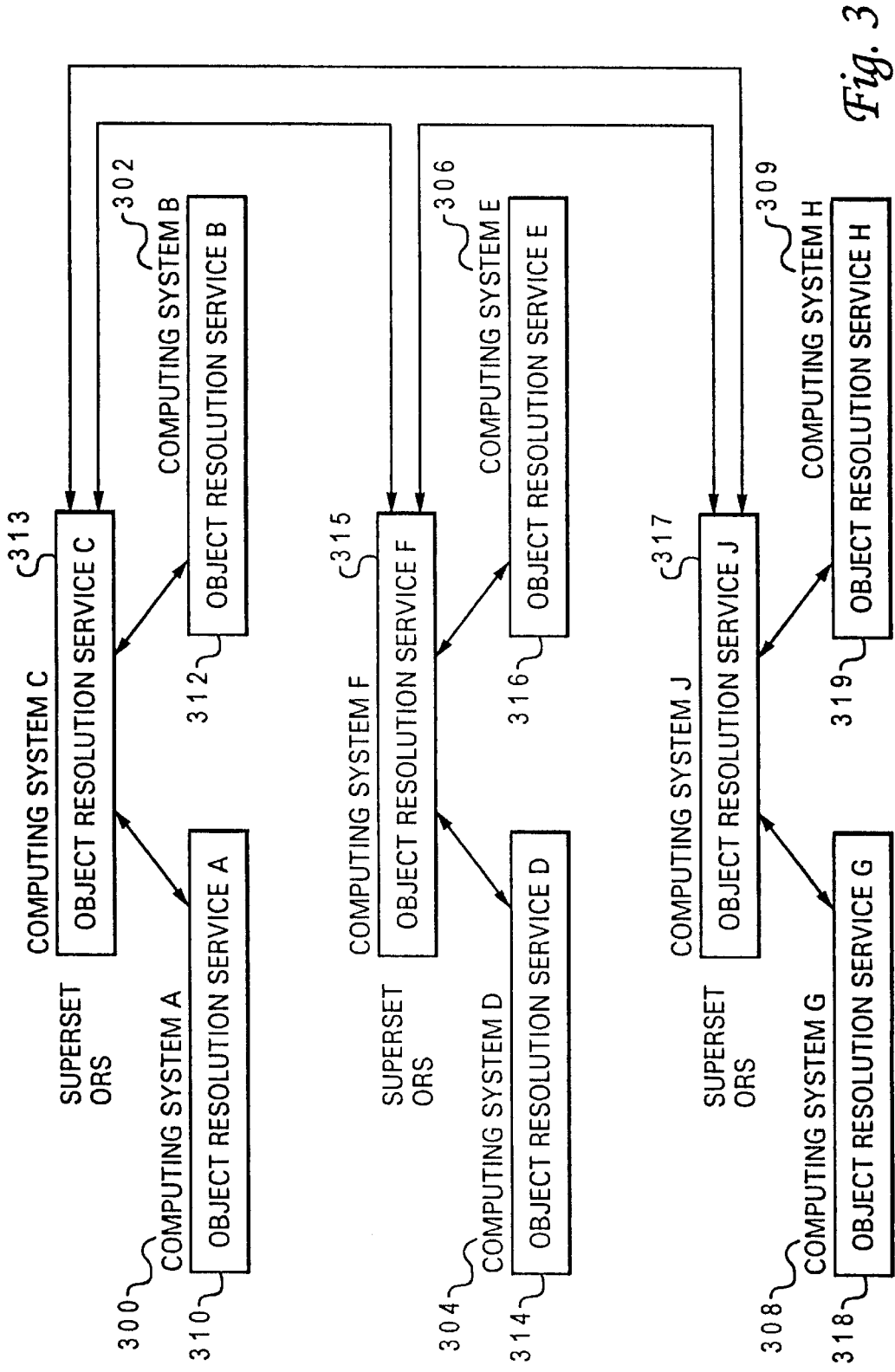
FIG. 3 illustrates an environment of multiple interconnected computing systems wherein an embodiment of the present invention will be illustrated.

Refer now to FIG. 3. FIG. 3 illustrates an environment of multiple interconnected computing systems wherein an embodiment of the present invention will be illustrated. Computing Systems A 300, B 302, D 304, E 306, G 308, and H 309 each contain a corresponding ORS with each ORS managing OARs within each ORS's own computing system. The ORSs, A 310, B 312, D 314, E 316, G 318, and H 319 have no knowledge of each other, but each has knowledge of one other ORS which is a superset ORS. ORS A 310 and B 312 are connected to superset ORS C 313, ORS D 314 and ORS E 316 are connected to superset ORS F 315, ORS G 318 and ORS H 319 are connected to superset ORS J 317. ORS C 313 is a superset of ORS A 310 and B 312, ORS F 315 is a superset of ORS D 314 and ORS E 316, ORS J 317 is a superset of ORS G 318 and ORS H 319.

Assume the administration file for ORS G 318 contains information directing it to forward any object ID resolution request to ORS J 317. The administration file at ORS J 317 contains information directing it to forward any object ID resolution request to ORS F 315 and C 313. Assume that application requests of an object's ID are resolved at ORS G 318. ORS G 318 will interrogate its set of OARs and then determine from its administration file that the request must be forwarded to ORS J 317. ORS J 317 will interrogate its set of OARs and then determine from its administration file that the request must also be forwarded to ORS F 315 and C 313. The combined results from ORS F 315, C 313, J 317, and G 318 will be returned to the requesting application.

Superset ORSs may also be configured such that they are supersets of other supersets. This is illustrated in FIG. 4.

Figure 4:
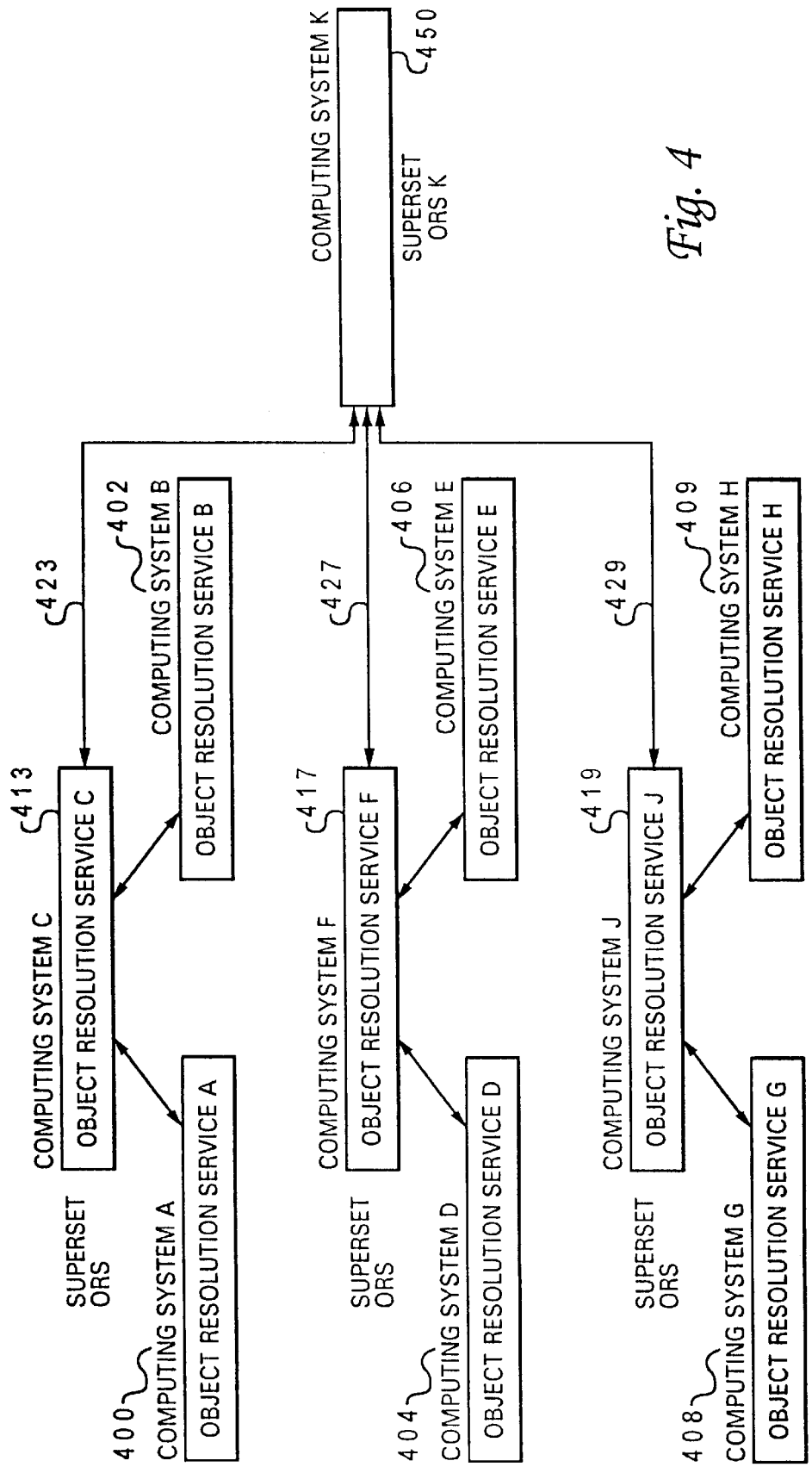
FIG. 4 shows an example of an embodiment of the present invention that utilizes a superset of supersets.

Refer now to FIG. 4. FIG. 4 shows an example of an embodiment of the present invention that utilizes a superset of supersets. Computing Systems A 400, B 402, D 404, E 406, G 408, and H 409 each contain a corresponding ORS with each ORS managing OARs within each ORS's own computing system. It is to be assumed that at some time prior to the current state of the system shown in FIG. 4, Superset ORS K 450 has sent a request to superset ORS C 413, F 417, and J 419 that it, Superset ORS K 450, be considered a superset ORS. Shown in FIG. 4 is that ORS C 413, F 417, and J 419 respond to this request with communication of full copies of their respective OARs via response communications 423, 427, and 429. The logic for creating and updating Superset ORS K 450 is the same as described earlier for creating superset ORS C 114. The Administration Files (not shown) for the ORSs shown in FIG. 4 specify Superset ORS K 450 as an ORS to which any object ID resolution request is to be forwarded.

Figure 5:
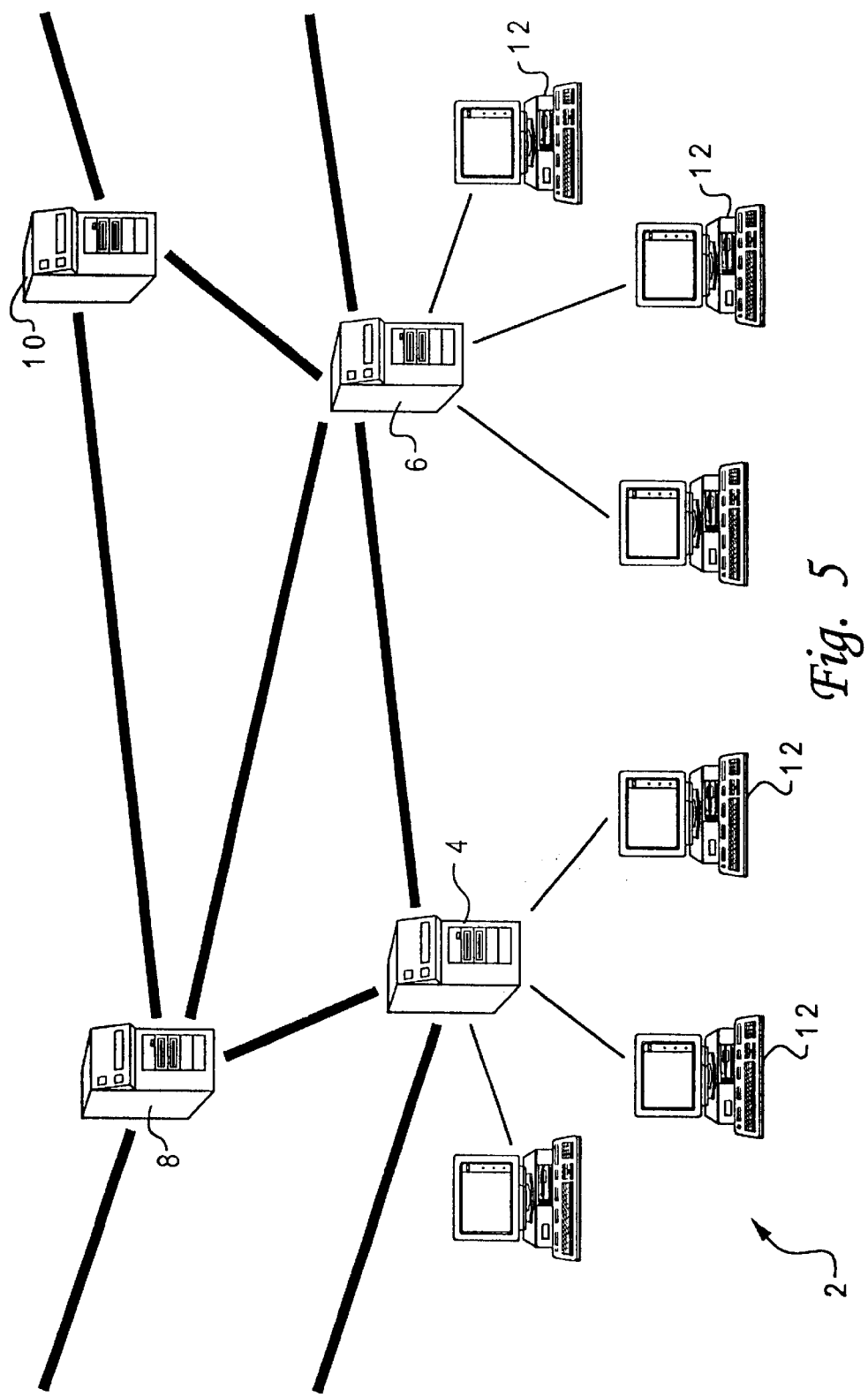
FIG. 5 depicts an illustrative type of network environment wherein the present invention can be implemented.
Figure 6:
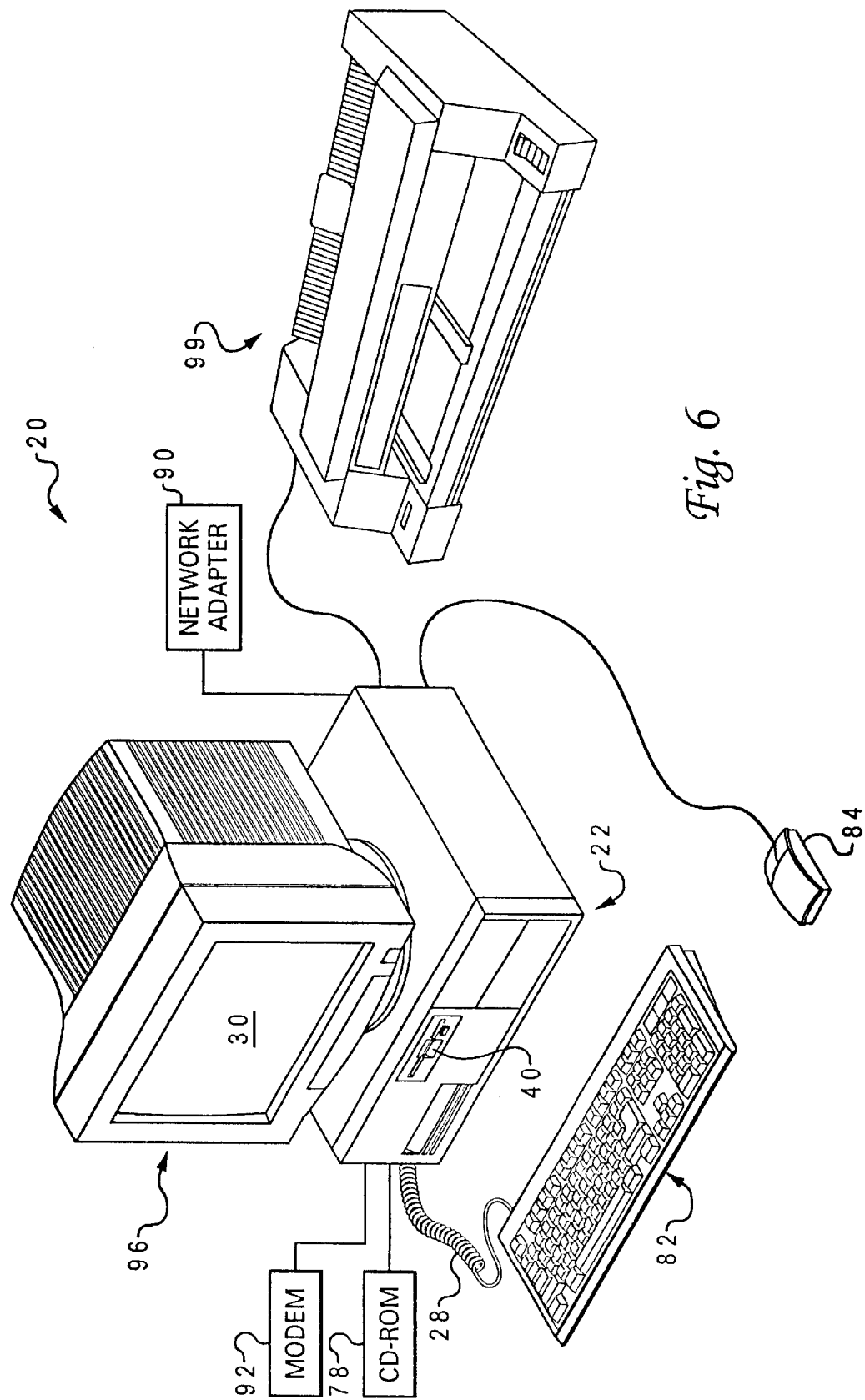
FIG. 6 depicts an illustrative type of computing system which can be utilized in a network.
Figure 7:
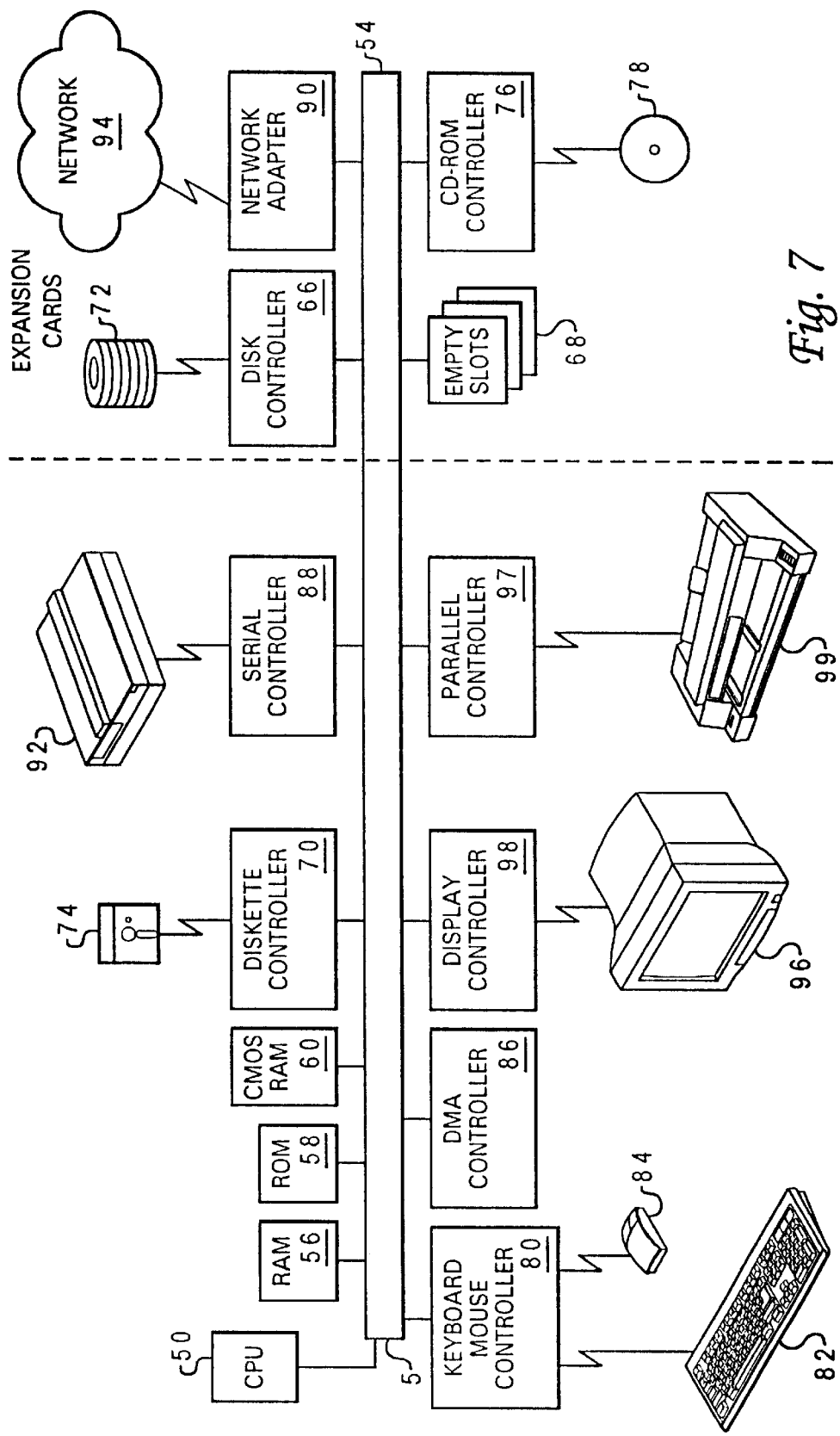
FIG. 7 depicts an alternative illustrative type of computing system which can be utilized in a network.

The foregoing discussion has referred generally to interconnected computing systems, or networks of computing system. FIG. 5 depicts an illustrative type of network environment wherein the present invention can be implemented. FIGS. 6 and 7 will depict an illustrative type of computing system which can be utilized in a network. Those skilled in the art will realize that the network and computing systems shown are merely illustrative, and that other types of networks and computing systems can form a suitable environment wherein the present invention can be practiced.

Refer now to FIG. 5. FIG. 5 depicts a generalized client-server computing network 2. Network 2 has several servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). As used herein, "PC" generally refers to any multi-purpose computer adapted for use by a single individual, regardless of the manufacturer, hardware platform, operating system, etc. A single, physical computer can act as both a server and a client, although this implementation occurs infrequently.

The information provided by a server can be in the form of programs which run locally on a given client 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

Refer now to FIG. 6. FIG. 6 illustrates a data processing system 20 in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 99 may also be coupled with processor 22.

It should be noted and recognized by those persons of ordinary skill in the art that display 96, keyboard 82, and pointing device 84 may each be implemented using any one of several known off-the-shelf components.

Refer now to FIG. 7. FIG. 7 shows a high level block diagram illustrating selected components that can be included in the data processing system 20 of FIG. 6 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work. Such software is one way in which the present invention can be implemented.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 7, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 99 may be coupled to data processing system 20 via parallel controller 97. Printer 99 is used to put text or a computer-generated image (or combinations thereof) on paper or on another medium, such as a transparency sheet. Other types of printers may include an image setter, a plotter, or a film recorder.

Parallel controller 97 is used to send multiple data and control bits simultaneously over wires connected between system bus 5 and another parallel communication device, such as a printer 99.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 7. Those skilled in the art will appreciate that a data processing system constructed in accordance with the present invention may have multiple components selected from the foregoing, including even multiple processors.

As a final matter, it is important that while an illustrative embodiment of the present invention has been described in the context of a fully functional interconnected computing systems, those skilled in art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include: recordable type media such as floppy disks, hard disk drives, CD ROMs, and transmission type media such as digital and analog communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention is particularly directed at networks of computing systems, it is applicable to actual network devices, such as dedicated servers, across any type of computer network. It is therefore contemplated that such modifications can be made without departing from the spirit or scope of the present invention as defined in the appended claims.

What is claimed is:

1. A method for locating data stored within an environment having multiple interconnected computing systems, said method comprising the steps of:

creating a superset of one or more elements comprised of data location identifiers and associated data attributes;

receiving a list of data attributes; and in response to said step of receiving, transmitting any data location identifiers, within said created superset, which have the data attributes in the list.

2. The method of claim 1, wherein said step of creating a superset further comprises the steps of:

obtaining one or more object identifiers and one or more associated object attributes of the objects identified by the object identifiers from specified two or more computing systems; and in response to said step of obtaining, creating one or more superset objects by pairing the one or more object identifiers and associated one or more object attributes with the computing system from which the one or more object identifiers and associated one or more object attributes were obtained.

3. The method of claim 2, wherein said step of receiving a list of attributes further includes the step receiving a list of object attributes.

4. The method of claim 3, wherein said step of transmitting any data location identifiers, within said created superset, which have the data attributes in the list, further comprises the steps of:

in response to said step of receiving the list of object attributes, comparing the attributes in the list of object attributes to the attributes of each one or more superset objects; and in response to said step of comparing the object attributes, retrieving the one or more object identifiers-computing system pairs which have the attributes in the list of object attributes.

5. The method of claim 1, wherein said step of creating a superset further comprises the steps of:

obtaining one or more object identifiers and one or more associated object attributes of the objects identified by the object identifiers from specified two or more computing systems; and in response to said step of obtaining, creating one or more superset objects by pairing the one or more object identifiers and associated one or more object attributes with the computing system from which the one or more object identifiers and associated one or more object attributes were obtained.

6. The method of claim 1, wherein said step of receiving a list of attributes further includes the step receiving a list of object attributes.

7. The method of claim 1, wherein said step of transmitting any data location identifiers, within said created superset, which have the data attributes in the list, further comprises the steps of:

in response to said step of receiving the list of attributes, comparing the attributes in the list of attributes to the attributes of each one or more superset elements; and in response to said step of comparing the attributes, retrieving the one or more data location identifiers which have the attributes in the list of data attributes.

8. The method of claim 1, wherein said step of creating a superset further comprises the steps of:

obtaining from at least a first Object Resolution Service (ORS) information related to one or more Object Attribute Records (OARs) under the control of the first ORS;

obtaining from at least a second ORS information related to one or more OARs under the control of the second ORS; and maintaining an object index, under the control of a superset ORS, utilizing said obtained first ORS information and said obtained second ORS information.

9. The method of claim 8, wherein said step of obtaining from at least a first ORS information further comprises the step of obtaining the current values of one or more attributes contained within the one or more OARs under the control of the first ORS.

10. The method of claim 9, wherein said step of obtaining from at least a second ORS information further comprises the step of obtaining each current values of one or more attributes contained within the one or more OARs under the control of the second ORS.

11. A system for locating data stored within an environment having multiple interconnected computing systems, said system comprising:

means for creating a superset of one or more elements comprised of data location identifiers and associated data attributes;

means for receiving a list of data attributes; and means, responsive to said means for receiving, for transmitting any data location identifiers, within said created superset, which have the data attributes in the list.

12. The system of claim 11, wherein said means for creating a superset further comprises:

means for obtaining one or more object identifiers and one or more associated object attributes of the objects identified by the object identifiers from specified two or more computing systems; and means, responsive to said means for obtaining, for creating one or more superset objects by pairing the one or more object identifiers and associated one or more object attributes with the computing system from which the one or more object identifiers and associated one or more object attributes were obtained.

13. The system of claim 12, wherein said means for receiving a list of attributes further includes means for receiving a list of object attributes.

14. The system of claim 13, wherein said means for transmitting any data location identifiers, within said created superset, which have the data attributes in the list, systems further comprises:

means, responsive to said step of receiving the list of object attributes, for comparing the attributes in the list of object attributes to the attributes of each one or more superset objects; and means, responsive to said step of comparing the object attributes, for retrieving the one or more object identifiers-computing system pairs which have the attributes in the list of object attributes.

15. The system of claim 11, wherein said means for creating a superset further comprises:

means for obtaining one or more object identifiers and one or more associated object attributes of the objects identified by the object identifiers from specified two or more computing systems; and means, responsive to said means for obtaining, for creating one or more superset objects by pairing the one or more object identifiers and associated one or more object attributes with the computing system from which the one or more object identifiers and associated one or more object attributes were obtained.

16. The system of claim 11, wherein said means for receiving a list of attributes further includes means for receiving a list of object attributes.

17. The system of claim 11, wherein said means for transmitting any data location identifiers, within said created superset, which have the data attributes in the list, further comprises:

means, responsive to said means for receiving the list of attributes, for comparing the attributes in the list of attributes to the attributes of each one or more superset elements; and means, responsive to said step of comparing the attributes, for retrieving the one or more data location identifiers which have the attributes in the list of data attributes.

18. The system of claim 11, wherein said means for creating a superset further comprises:

means for obtaining from at least a first Object Resolution Service (ORS) information related to one or more Object Attribute Records (OARs) under the control of the first ORS;

means for obtaining from at least a second ORS information related to one or more OARs under the control of the second ORS; and means for maintaining an object index, under the control of a superset ORS, utilizing said obtained first ORS information and said obtained second ORS information.

19. The system of claim 18, wherein said means for obtaining from at least a first ORS information further comprises means for obtaining the current values of one or more attributes contained within the one or more OARs under the control of the first ORS.

20. The system of claim 19, wherein said means for obtaining from at least a second ORS information further comprises means for obtaining each current values of one or more attributes contained within the one or more OARs under the control of the second ORS.

* * * * *